United States Patent [19]
Anderson et al.

[11] 3,837,699
[45] Sept. 24, 1974

[54] METHOD AND APPARATUS FOR BREAKING ANIMAL CARCASSES AND HANDLING MEAT PRODUCTS

[75] Inventors: A. D. Anderson, Sioux City, Iowa; Walter E. Lauridsen, South Sioux City, Nebr.; Charles L. Overstreet, Sioux City, Iowa

[73] Assignee: Iowa Beef Processors, Inc., Dakota City, Nebr.

[22] Filed: July 15, 1971

[21] Appl. No.: 163,001

Related U.S. Application Data
[62] Division of Ser. No. 706,557, Feb. 19, 1968, Pat. No. 3,593,369.

[52] U.S. Cl............ 294/118, 17/44.3, 294/3, 294/80
[51] Int. Cl............ B66c 1/30
[58] Field of Search........... 294/79, 80, 106, 118, 2, 294/3; 17/44, 24, 44.2, 44.3

[56] References Cited
UNITED STATES PATENTS

| | | | |
|---|---|---|---|
| 71,628 | 12/1867 | Marlin | 294/118 X |
| 171,413 | 12/1875 | Nelson | 294/118 |
| 336,357 | 2/1886 | Taylor | 294/2 |
| 940,924 | 11/1909 | Condell et al. | 17/44.3 |
| 1,432,952 | 10/1922 | Bergman | 294/3 |
| 1,530,675 | 3/1925 | Janes | 294/79 |
| 1,572,178 | 2/1926 | Bermond | 17/44.3 |
| 2,358,682 | 9/1944 | Benton et al. | 294/118 X |

FOREIGN PATENTS OR APPLICATIONS

| | | | |
|---|---|---|---|
| 406,793 | 3/1934 | Great Britain | 17/44.3 |

*Primary Examiner*—Evon C. Blunk
*Assistant Examiner*—Johnny D. Cherry
*Attorney, Agent, or Firm*—Browne, Beveridge, DeGrandi & Kline

[57] ABSTRACT

Meat-supporting tongs are provided with opposed plates which carry a plurality of blunt projections for engaging the meat, and pointed projecting members which extend a greater distance than the blunt projections to promote initial engagement between the plates and the meat prior to movement of the blunt projections into contact with the meat. A chain or other elongated flexible member is used to attach the tong support linkage to an overhead support rail.

6 Claims, 5 Drawing Figures

PATENTED SEP 24 1974  3,837,699
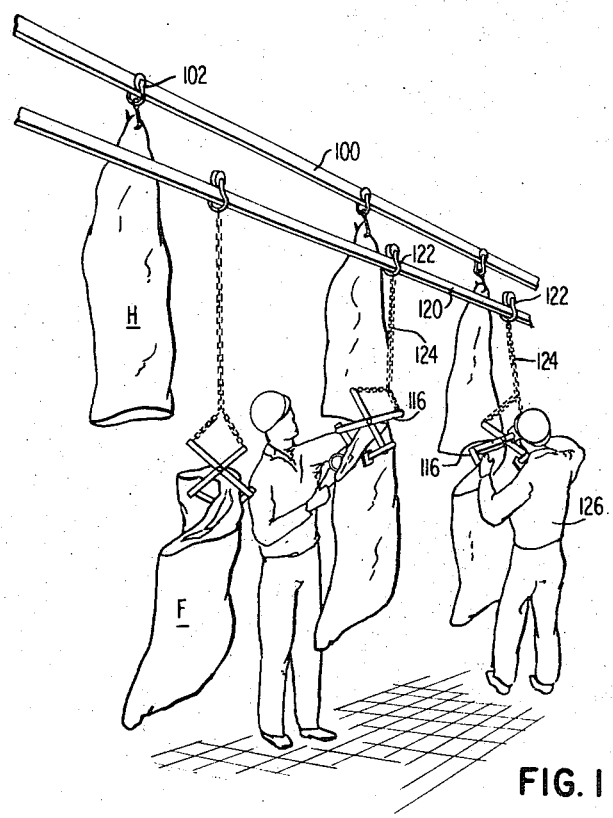
FIG. 1
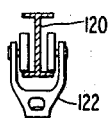
FIG. 2
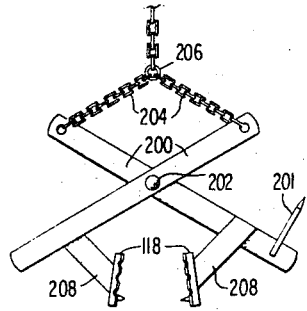
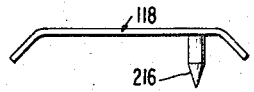
FIG. 4
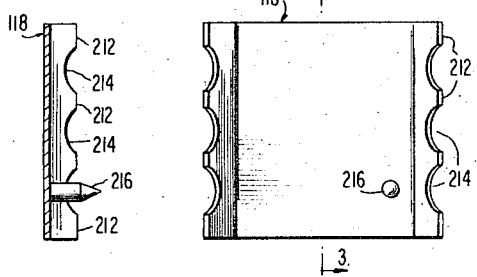
FIG. 3
FIG. 5

3,837,699

METHOD AND APPARATUS FOR BREAKING ANIMAL CARCASSES AND HANDLING MEAT PRODUCTS

This is a division of application Ser. No. 706,557 filed Feb. 19, 1968, now U.S. Pat. No. 3,593,369.

BACKGROUND OF INVENTION

This invention is directed to the construction of tongs for supporting a body of meat in a manner which will minimize damage to the meat while assuring firm gripping engagement of the tongs with the meat. The invention is particularly suited for use in large scale carcass breaking operations wherein the tongs are capable of supporting large bodies of meat such as a beef forequarter.

Heretofore, various types of tongs have been used for supporting meat; however, they have typically required substantial penetration of the body of meat and are inherently incapable of being readily engaged with large bodies of meat without significant damage to the meat.

SUMMARY OF THE INVENTION

This invention avoids the shortcomings of the prior art by providing the tongs with a pair of opposed plates which are movable together under the influence of a support linkage means. Each of the plates has a plurality of blunt projections for promoting engagement of the plates with the meat, and a sharp projection which extends a greater distance than the blunt projections in order to promote initial engagement of the tongs with the meat before the plates come into contact with the body of meat. A chain or other elongated flexible member attaches the tong support linkage to an overhead support rail to facilitate manipulation of the tongs into engagement with the meat.

DESCRIPTION OF THE DRAWINGS

FIG. 1 illustrates that area of the beef breaking facility where a forequarter of beef is supported by a pair of tongs as it is severed from a hindquarter;

FIG. 2 is an elevation of a pair of meat-supporting tongs for the handling of meat;

FIGS. 3, 4 and 5 are sectional, plan and elevational views of a meat-engaging plate used in the tongs of FIG. 2.

DESCRIPTION OF PREFERRED EMBODIMENTS

This description which pertains only to the illustrated and preferred embodiments is intended to be representative only and is susceptible to numerous modifications, variations and substitutions which fall within the broad conceptual areas defined in the claims.

As mentioned previously, present methods of subdividing a beef carcass into primal cuts involve substantial amount of manual handling of large bodies of meat and a relatively inefficient use of the saws and other devices used in their subdivision.

This invention, on the other hand, provides a novel tong construction which enables heavier portions of the carcass to be handled in a manner which eliminates all lifting and manual transferring of the meat. This is done by a series of conveyors which pass through cutting stations in a manner which permits the large bodies of meat to be supported by tongs on a conveyor after they are separated from the carcass. As used herein, the term "carcass" is intended to include an eviscerated and dressed animal or any subportion thereof such as sides or quarters which cannot conveniently be carried by an ordinary workman.

The steps of applying the meat tongs to the forequarter and severing the forequarter from the suspended carcass are shown in FIG. 1 where the worker 126 is shown in the process of placing the pair of tongs 116 on the forequarter. Once the tongs engage the opposite sides of the forequarter, the weight of the body of meat tends to bring the tongs into more secure engagement with the forequarter and enables the tongs adequately to support the forequarter through the chain 124 or other flexible elongated member which depends from the trolley 122 on the overhead rail 120. The worker 126 then uses a knife to complete the severance of the forequarter F from the hindquarter H.

The hindquarter and the remainder of the forequarter continue moving on their respective rails 100 and 120 through a series of subsequent stations where subportions such as primal cuts are removed therefrom by cutting, preferably by conventional power saws used in the butchering industry.

The tongs are shown in FIGS. 2–5. They may be equally useful in handling any other large bodies of meat. The tongs are supported on a conveyor rail 120 by a trolley 122 which is driven by a continuous chain (not shown). A chain 124 connects the tongs 116 to the trolley and permits them to be swung laterally during the operations shown in FIG. 1.

The tongs themselves include a pair of arms 200 which are pivotally connected at 202 and have their upper ends supported by the flexible chains 204 which connect to the suspending chain 124 at a ring 206.

The lower ends of the arms 200 have extensions 208 which carry the meat-engaging plates 118. There is also an upwardly directed spike 201 on one of the arms 200 which may be used to carry primal cuts or other loose bodies of meat.

FIGS. 3–5 show the preferred construction of the plates 118. They are relatively flat and have their vertically extending marginal portions bent inwardly as shown in FIG. 4 to provide an edge surface 212 which contacts the meat. Preferably, each edge surface 212 is divided into a series of blunt projections by locating notches 214 therealong as shown in FIGS. 3 and 5. The use of the plates 118 minimizes penetration of the meat by the tongs and therefore avoids any significant damage to the meat during its suspension by the tongs.

Each of the plates may also carry a single pointed member 216 which extends toward the opposite plate a distance substantially greater than do the projections of the edge 212. One of these pointed members is located on a lower portion of each plate and is offset to one side as shown in FIG. 5. They are also offset from each other.

It will be apparent from FIG. 9 that as the plates move in a downward direction, the linkages formed by the arms 200 and the chain sections 204 will bring the plate 118 against the opposite sides of a body of meat to support it securely from the conveyor rail 120 and trolley 122. An important purpose of the pointed members 216 is to assure initial engagement of the plates 118 with the meat so there will be some downward movement of the plates 118 when they are subjected to the weight of the meat. The pointed members 216 will penetrate and perhaps lie between some of the bones in the meat. Without the members 216, there is a possibility that the body of meat will slip from the tongs before being brought into sufficiently firm engagement with the plate 118 and the projections 212. This arrangement also simplifies the task of placing the tongs on the body of meat, and prevents the twisting of the suspended meat between the plates 118.

This specification has dealt solely with a preferred embodiment of the invention. Throughout the specification and particularly in the claims which follow, the terms used are intended to be given their broadest interpretation considered in light of the present state of the art.

We claim:

1. Tongs for handling meat comprising a pair of plates supported for relative movement toward and away from each other, each of said plates having a plurality of blunt projections directed toward the other plate to promote engagement of the plates with the meat, said tongs having a support linkage means which biases the plates toward each other upon downward movement of the plates, each plate carrying a pointed projecting member which extends toward the other plate a distance greater than said blunt projections to promote initial engagement between the plates and the meat prior to movement of the projections into contact with the meat, and an elongated flexible member attached to the support linkage means for connecting the tongs to a support rail, whereby the tongs may swing laterally and be manipulated by a worker into engagement with a body of meat.

2. Tongs according to claim 1 in which at least some of said projections are formed by marginal portions of each plate bent in a direction toward the opposite plate.

3. Tongs according to claim 2 in which the marginal portions are notched and extend vertically along opposite sides of each plate.

4. Tongs according to claim 3 having an upwardly projecting spike for penetrating and supporting a piece of meat other than the one between said plates.

5. Tongs according to claim 1 having a pivotal connection above the plates, flexible members each connected to one of the arms above the pivotal connection whereby downward movement of the plates results in movement of the plates toward each other.

6. Tongs according to claim 1 having an upwardly projecting spike for penetrating and supporting a piece of meat other than the one between said plates.

* * * * *